United States Patent
Sugiura et al.

(10) Patent No.: US 11,597,396 B2
(45) Date of Patent: Mar. 7, 2023

(54) VEHICLE CONTROL DEVICE

(71) Applicant: DENSO CORPORATION, Kariya (JP)

(72) Inventors: Takanori Sugiura, Kariya (JP); Shota Nojiri, Kariya (JP); Yuusaku Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 138 days.

(21) Appl. No.: 17/142,511

(22) Filed: Jan. 6, 2021

(65) Prior Publication Data

US 2021/0146937 A1 May 20, 2021

Related U.S. Application Data

(62) Division of application No. 15/744,559, filed as application No. PCT/JP2016/080509 on Oct. 14, 2016, now Pat. No. 10,913,462.

(30) Foreign Application Priority Data

Dec. 2, 2015 (JP) .................................. 2015-235984

(51) Int. Cl.
| | |
|---|---|
| *B60W 50/00* | (2006.01) |
| *B60K 35/00* | (2006.01) |
| *B60W 30/14* | (2006.01) |
| *B60R 1/00* | (2022.01) |
| *G01C 21/36* | (2006.01) |

(Continued)

(52) U.S. Cl.
CPC ......... *B60W 50/0098* (2013.01); *B60K 35/00* (2013.01); *B60R 1/00* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 3,508,191 A * | 4/1970 | Du Vivier | G08G 1/075 340/920 |
| 4,600,913 A * | 7/1986 | Caine | B60Q 1/302 340/479 |

(Continued)

FOREIGN PATENT DOCUMENTS

| | | |
|---|---|---|
| JP | 2002170199 A | 6/2002 |
| JP | 2004287672 A * | 10/2004 |

(Continued)

*Primary Examiner* — Shelley Chen
(74) *Attorney, Agent, or Firm* — Harness, Dickey & Pierce, P.L.C.

(57) ABSTRACT

A vehicle control device includes: a first detection unit that detects a traveling state of a host vehicle; a merging detection unit that detects that the host vehicle approaches within a predetermined area of a merging point when the host vehicle travels on the merging road toward the merging point at which a main road joins with the merging road; a second detection unit that detects a speed of a lane flow by another vehicle that travels on the main road toward the merging point; a position detection unit that obtains a position of a pre-merging point as a virtual point on the main road reaching the merging point when the host vehicle reaches the merging point; and a display control unit that controls a display device to display the position of the host vehicle and the pre-merging point.

2 Claims, 7 Drawing Sheets

(51) Int. Cl.
   *G08G 1/16*      (2006.01)
   *B60W 30/18*     (2012.01)
   *B60W 50/14*     (2020.01)
   *G05D 1/02*      (2020.01)
   *G01C 21/34*     (2006.01)

(52) U.S. Cl.
   CPC ...... *B60W 30/14* (2013.01); *B60W 30/18163* (2013.01); *B60W 50/14* (2013.01); *G01C 21/3602* (2013.01); *G01C 21/3658* (2013.01); *G05D 1/0223* (2013.01); *G05D 1/0253* (2013.01); *G05D 1/0257* (2013.01); *G05D 1/0278* (2013.01); *G08G 1/161* (2013.01); *G08G 1/166* (2013.01); *B60K 2370/152* (2019.05); *B60K 2370/166* (2019.05); *B60K 2370/167* (2019.05); *B60K 2370/168* (2019.05); *B60K 2370/193* (2019.05); *B60R 2300/8086* (2013.01); *B60R 2300/8093* (2013.01); *B60W 2050/146* (2013.01); *B60W 2400/00* (2013.01); *B60W 2420/403* (2013.01); *B60W 2420/52* (2013.01); *B60W 2554/801* (2020.02); *B60W 2556/00* (2020.02); *B60W 2710/0644* (2013.01); *B60W 2710/18* (2013.01); *B60W 2710/20* (2013.01); *B60W 2720/106* (2013.01); *G01C 21/34* (2013.01); *G05D 2201/0213* (2013.01)

(56) References Cited

U.S. PATENT DOCUMENTS

| | | | |
|---|---|---|---|
| 5,761,630 A * | 6/1998 | Sekine | G05D 1/0278 701/301 |
| 6,304,811 B1 * | 10/2001 | Prestl | B60W 30/16 701/119 |
| 7,877,187 B2 * | 1/2011 | Hori | G08G 1/096783 340/436 |
| 9,050,931 B2 * | 6/2015 | Yamamoto | G06T 3/4038 |
| 9,146,127 B2 | 9/2015 | Bank et al. | |
| 9,283,963 B2 * | 3/2016 | Taner | G08G 1/167 |
| 9,482,540 B2 | 11/2016 | Shen | |
| 9,738,280 B2 * | 8/2017 | Rayes | B60W 30/143 |
| 2005/0015203 A1 * | 1/2005 | Nishira | B60W 50/16 340/436 |
| 2006/0235597 A1 * | 10/2006 | Hori | B60Q 1/50 701/96 |
| 2007/0018801 A1 * | 1/2007 | Novotny | B60Q 9/008 340/435 |
| 2012/0078500 A1 * | 3/2012 | Yamada | G06V 10/803 701/301 |
| 2012/0188374 A1 * | 7/2012 | Taner | B60W 30/18163 348/148 |
| 2012/0283942 A1 * | 11/2012 | T'Siobbel | G01C 21/26 701/410 |
| 2013/0085976 A1 * | 4/2013 | Bone | B60W 30/18163 706/46 |
| 2017/0305365 A1 * | 10/2017 | Matsumoto | B60K 37/06 |
| 2021/0387634 A1 * | 12/2021 | Luna Arriaga | B60Q 9/008 |
| 2022/0048513 A1 * | 2/2022 | Xu | B60W 60/00274 |

FOREIGN PATENT DOCUMENTS

| | | |
|---|---|---|
| JP | 2007133672 A | 5/2007 |
| JP | 4830621 B2 | 12/2011 |
| JP | 2015081057 A | 4/2015 |
| JP | 5966841 B2 * | 8/2016 |
| JP | 6304811 B2 * | 4/2018 |

* cited by examiner

VEHICLE CONTROL DEVICE

CROSS REFERENCE TO RELATED APPLICATIONS

This application is a divisional Application of U.S. patent application Ser. No. 15/744,559 filed on Jan. 12, 2018 which is a U.S. National Phase Application under 35 U.S.C. 371 of International Application No. PCT/JP2016/080509 filed on Oct. 14, 2016 and published in Japanese as WO 2017/094364 A1 on Jun. 8, 2017. These applications are based on and claim the benefit of priority from Japanese Patent Application No. 2015-235984 filed on Dec. 2, 2015. The entire disclosures of all of the above applications are incorporated herein by reference.

TECHNICAL FIELD

The present disclosure relates to a vehicle control device that performs a control when a host vehicle reaches another road.

BACKGROUND ART

Up to now, as disclosed in Patent Literature 1, a device that displays various kinds of information as an index of a driving operation on a display of the host vehicle to assist the driving operation when a vehicle operated by a driver reaches another road (that is, a main road) from a traveling road (that is, a merging road) has been proposed.

However, for example, in the case where the self-driving is performed, when the host vehicle approaches a merging point, an occupant such as a driver may feel uneasy.

More specifically, if there is another vehicle traveling towards the merging point on the main road relative to a host vehicle approaching the merging point on the merging road, the other vehicle gradually approaches the host vehicle. For that reason, the occupant may feel uneasy such as whether the host vehicle can successfully join the other vehicle, or not.

PRIOR ART LITERATURES

Patent Literature

Patent Literature 1: Japanese Patent No. 4830621

SUMMARY

It is an object of the present disclosure to provide a vehicle control device giving a sense of security to an occupant when a host vehicle approaches a merging point.

According to an aspect of the present disclosure, a vehicle control device includes: a first detection unit that detects a traveling state including at least a position and a speed of a host vehicle; a merging detection unit that detects that the host vehicle approaches within a predetermined area of a merging point on a road in which a merging road and a main road join together at the merging point when the host vehicle travels on the merging road toward the merging point; a second detection unit that detects a speed of a lane flow by another vehicle that travels on the main road toward the merging point; a position detection unit that sets a pre-merging point as a virtual point moving on the main road toward the merging point according to the lane flow, the pre-merging point reaching the merging point when the host vehicle reaches the merging point, and obtains a position of the pre-merging point on the main road at a present time based on a time required for the host vehicle to reach the merging point and the speed of the lane flow on the main road when the host vehicle approaches within the predetermined area of the merging point; and a display control unit that controls a display device to display the position of the host vehicle on the merging road at the present time and the position of the pre-merging point on the main road at the present time.

According to the vehicle control device described above, when the host vehicle is approaching the merging point, the current position of the host vehicle and the current position of the pre-merging point can be displayed on the display device. The pre-merging point moves toward the merging point at the flow speed of the lane as if the pre-merging point is the other vehicle traveling on the main road. Therefore, the display device can display the host vehicle approaching the merging point on the merging road and the pre-merging point approaching the merging point on the main road with time.

Therefore, the occupant can predict how the host vehicle will join the other vehicle, for example, during self-driving, while viewing such a display. In other words, the occupant can know how the host vehicle joins the other vehicle at the target merging point. Therefore, the occupant's feeling of uneasiness can be reduced, and the sense of security is greatly improved.

BRIEF DESCRIPTION OF DRAWINGS

The above and other objects, features and advantages of the present disclosure will become more apparent from the following detailed description made with reference to the accompanying drawings. In the drawings.

EMBODIMENTS

Hereinafter, an embodiment of the present disclosure will be described with reference to the drawings.

1. Embodiment

[1-1. Configuration]

First, a system configuration of a vehicle control device according to the present embodiment will be described.

Figure 1:
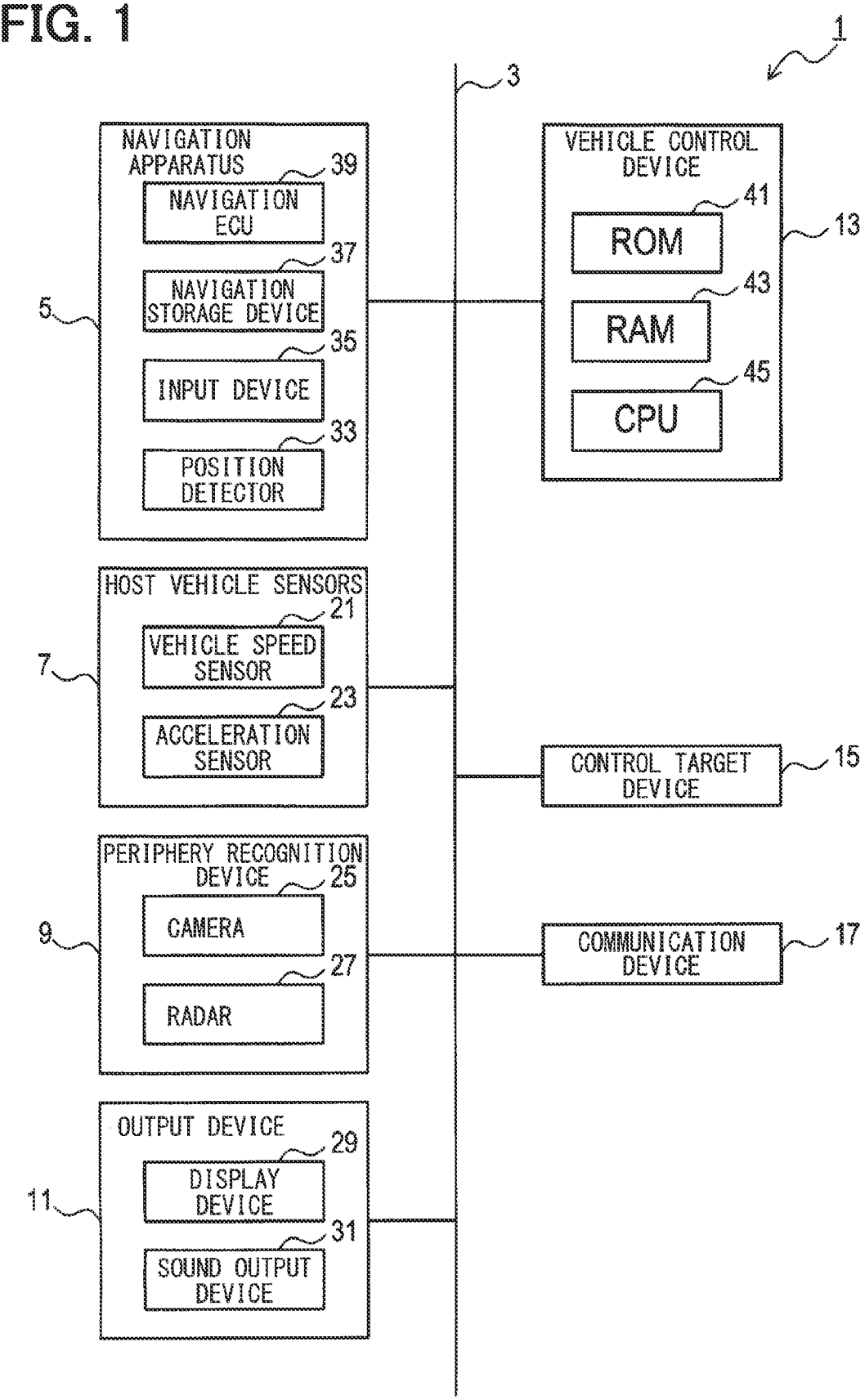
FIG. 1 is a block diagram showing a vehicle system including a vehicle control device according to an embodiment.

As shown in FIG. 1, a vehicle system 1 according to the present embodiment is a system capable of self-driving of a vehicle, and is configured by various devices mounted on a host vehicle J shown in FIG. 3 as will be described later.

Figure 4:
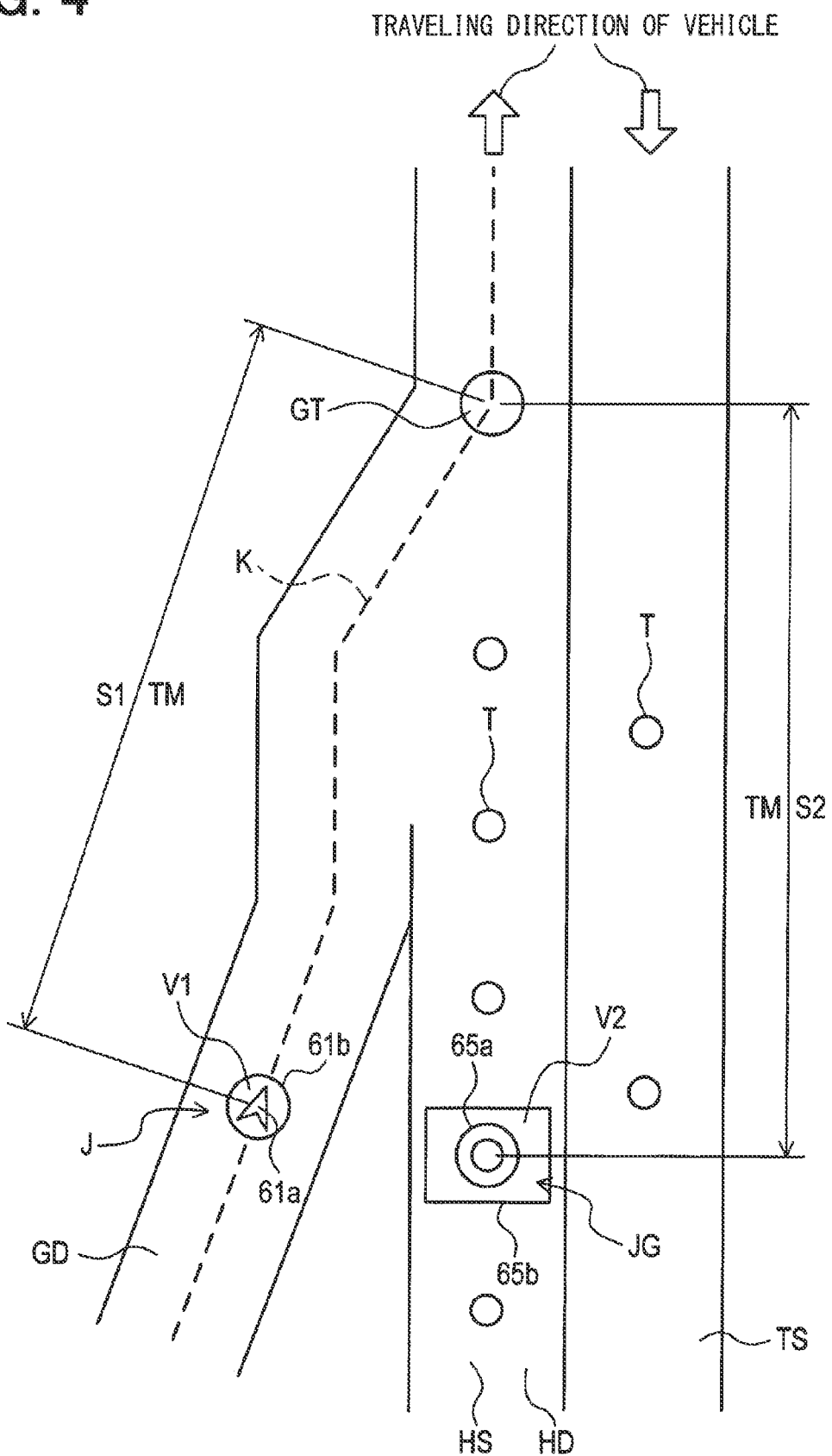
FIG. 4 is an illustrative view showing a method of obtaining a position of a pre-merging point.

The vehicle system 1 has a self-driving function for automatically driving the host vehicle J to a destination according to a travel route that is a route to a destination set by a driver or the like, that is, a planned travel route K shown in FIG. 4. The self-driving function is realized by multiple functions for supporting the driving of the host vehicle J.

The multiple functions configuring the self-driving function include, for example, a steering angle control function, a vehicle speed control function, an acceleration and deceleration control function, a lane change function, and the like. In the present specification, the steering angle control function is a function of controlling a steering so as to follow the planned travel route K. The vehicle speed control function is a function of controlling a vehicle speed of the host vehicle J to a target vehicle speed. The acceleration and deceleration control function is a function of controlling acceleration and deceleration of the host vehicle J. The lane change function is a function of changing a lane in which the host vehicle J travels.

As a technique related to self-driving, a level of automation is classified into, for example, a level 1 (that is, driving support system), levels 2 and 3 (that is, semi-self-travel system), and a level 4 (that is, complete self-travel system). In general, when the self-driving is carried out, the automation of the levels 2 to 4 is shown. The detail is described, for example, in "Strategic Innovation Promotion Program Automated Driving System" announced in May 2015 by the Cabinet Office.

In this example, a case of the level 3 in which when the self-driving of the level 2 or higher is performed, for example, a case of the level 3 that performs the self-driving in which the host vehicle J can automatically travel even when the driver does not operate the host vehicle J will be described.

As shown in FIG. 1, the vehicle system 1 described above includes a navigation apparatus 5, host vehicle sensors 7, a periphery recognition device 9, an output device 11, a vehicle control device 13, a control target device 15, a communication device 17 and the like, which are connected to each other by a LAN 3. In the following description, the electronic control device will be referred to as an ECU. The ECU is an abbreviation for electronic control unit.

Hereinafter, the respective configurations will be described.

The host vehicle sensors 7 are well-known devices that detect a state of the host vehicle J. The host vehicle sensors 7 include a vehicle speed sensor 21 that detects a speed of the host vehicle J, an acceleration sensor 23 that detects a longitudinal acceleration and the like, and so on.

The periphery recognition device 9 is a well-known device that recognizes circumstances around the host vehicle J.

The periphery recognition device 9 includes a well-known camera 25 (for example, a CCD camera) that recognizes the circumstances around the host vehicle J based on the result of imaging a periphery of the host vehicle J and performing image processing.

As the camera 25, for example, there are a forward imaging camera having an imaging area in front of the host vehicle J, a right lateral camera having an imaging area on a right side of the host vehicle J, and a left lateral camera having an imaging area on a left side of the host vehicle.

The periphery recognition device 9 is not limited to the camera 25 but may be a well-known monitoring device that irradiates a probe wave and monitors a road condition according to the result of receiving a reflected wave of the irradiated probe wave. In the present specification, the monitoring device includes a radar 27 such as a well-known infrared radar that transmits and receives infrared rays as the probe wave, and a well-known millimeter wave radar that transmits and receives electromagnetic waves in the millimeter wave band as the probe wave, and a well-known sonar that transmits and receives a sound wave as the probe wave.

The output device 11 is a well-known device for notifying information from the vehicle control device 13. The output device 11 is provided with a display device 29 for displaying information, for example, a display device 29 such as a display for displaying various information arranged on an instrument panel on a front side in a vehicle interior, a sound output device (for example, a speaker) 31 that outputs information by sound or the like.

The navigation apparatus 5 is a device for guiding a route to a destination according to the planned travel route K. The navigation apparatus 5 includes a position detector 33, an input device 35, a navigation storage device 37, and a navigation ECU 39.

The position detector 33 detects information necessary for detecting the current position of the host vehicle J and an azimuth of the traveling direction. The position detector 33 includes a receiver for receiving a signal from a navigation satellite. In the present specification, the navigation satellite is a satellite that realizes a well-known satellite positioning system, such as a global positioning system satellite (for example, GPS satellite) and a Galileo in-orbit validation element satellite (for example, GIOVE satellite).

Signals from the vehicle speed sensor 21, the acceleration sensor 23, a gyro sensor not shown for detecting an angular velocity of the host vehicle J, and so on are input to the position detector 33.

The input device 35 is a well-known device that accepts input of information. The input device 35 includes, for example, a well-known switch group and a touch panel formed integrally with the display device 29.

The navigation storage device 37 is a rewritable nonvolatile storage device. The navigation storage device 37 is configured by, for example, a hard disk drive or a flash memory.

Map data (for example, map information) representing a structure of the roads is stored in the navigation storage device 37. The map data includes various data such as node data, link data, cost data, terrain data, mark data, intersection data, and facility data. Among those pieces of data, the node data represents coordinates at each specific point on the road, that is, positions indicated by latitude, longitude, and altitude.

In the present specification, the specific point on the road includes a merging point where one road merges with another road different from the one road, that is, a merging point where a merging road to be described later merges into a main road.

In other words, the specific point includes a merging point on a road on which a vehicle driven by self-driving can travel, for example, on a general road, or a merging point on a road exclusively for a car such as a highway, for example, a merging point in a ramp way, an interchange, a junction, or the like.

Link data represents each road (in other words, link) that connects between nodes. The cost data represents a unit cost that is previously allocated to each link. Facility data represents the position and contents of a pedestrian crossing and various signs installed on the road.

The navigation ECU 39 is a well-known electronic control device including a ROM, a RAM, and a CPU. The navigation ECU 39 identifies the current position of the host vehicle J, that is, the latitude, longitude, and altitude through a well-known technique conforming to a satellite navigation realized by the satellite positioning system on the basis of a signal received by a receiver included in the position detector 33.

The method of identifying the current position of the host vehicle J by the navigation ECU 39 is not limited to the above configuration, but may identify the current position of the host vehicle J by a well-known autonomous navigation according to the detection results of the vehicle speed sensor 21 and the gyro sensor, or may correct the current position of the host vehicle J identified by the satellite navigation, through the autonomous navigation for identification.

The control target device 15 is a controlled device that is controlled by the vehicle control device 13. Although not shown, the controlled device according to the present embodiment includes a steering control device for controlling a steering angle of a steering wheel, a drive control device for controlling a driving force of the host vehicle J, and a braking control device for controlling a braking force of the host vehicle J.

In the present specification, the drive control device may be configured by an internal combustion engine control device that controls a rotational speed and a torque of the internal combustion engine as long as the host vehicle J is a vehicle having an internal combustion engine as an engine that generates the driving force of the subject vehicle J. If the host vehicle J is a vehicle having an internal combustion engine, the drive control device may include a mission control device for controlling the transmission of the host vehicle J.

In addition, the drive control device may be configured by a motor control device that controls the rotational speed of a motor as long as the host vehicle J is a vehicle having an electric motor as an engine that generates the driving force of the subject vehicle J.

Figure 3:
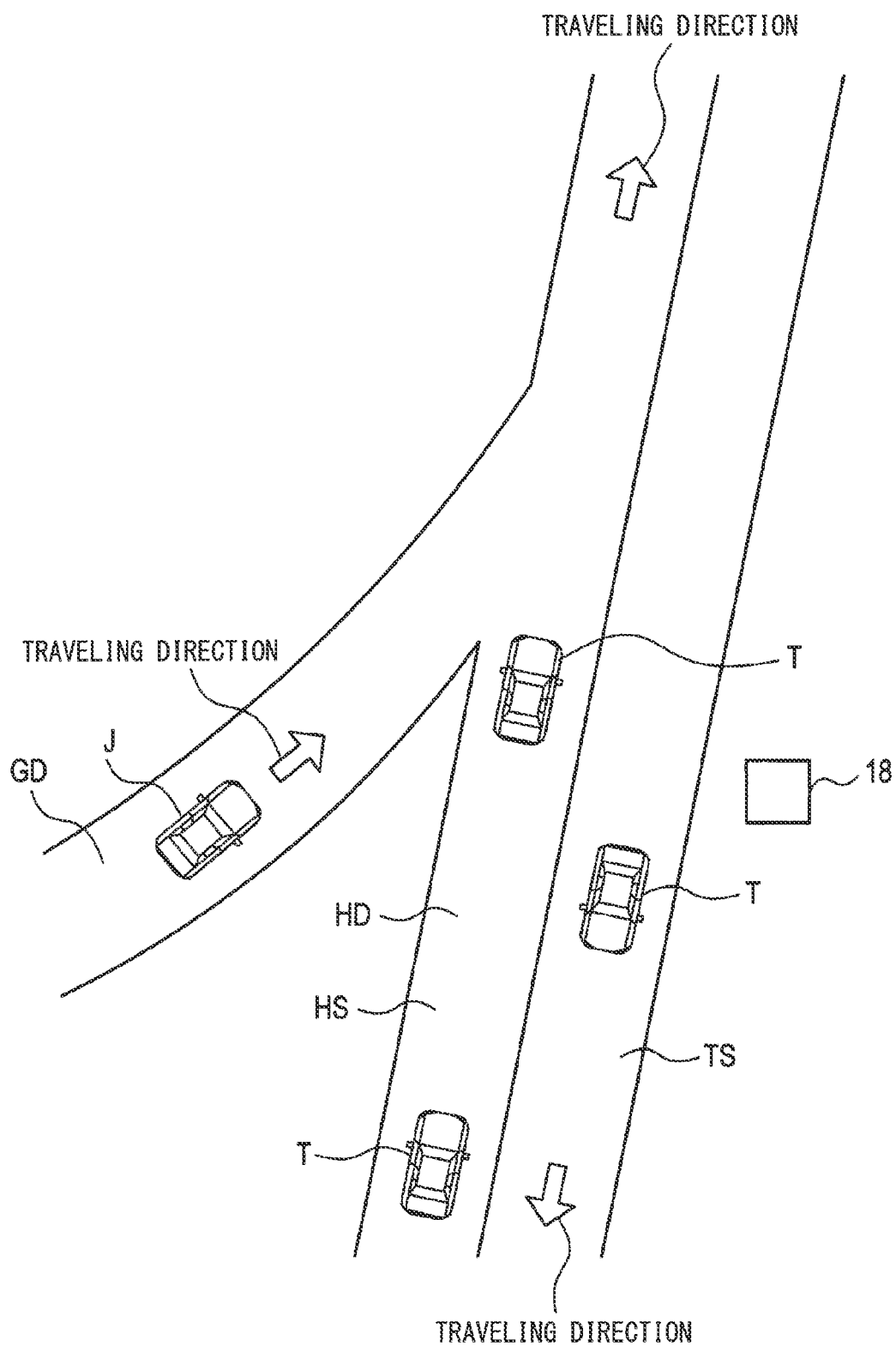
FIG. 3 is an illustrative view exemplifying a state of a vehicle traveling on a merging lane.

The communication device 17 is a communication device for enabling a communication between the host vehicle J and the other vehicle T (that is, vehicle-to-vehicle communication), and a communication (that is, road-to-vehicle communication) between the host vehicle J and a roadside device 18 shown in FIG. 3 which is a communication device of a base station disposed on a road side.

In this example, when the vehicle-to-vehicle communication is performed between the host vehicle J and the other vehicle T, the host vehicle J can obtain information on the position and the speed of the other vehicle T. In addition, when the road-to-vehicle communication is performed between a vehicle traveling on the road, that is, the host vehicle J or the other vehicle T and the roadside device 18, the host vehicle J can obtain the information on the position and the velocity of the other vehicle T transmitted to the roadside device 18, from the roadside device 18. The roadside device 18 is connected to, for example, a server not shown such as a center for managing, for example, road information, and can obtain necessary information from the server.

The vehicle control device 13 is a well-known control device mainly configured by a well-known microcomputer including a ROM 41, a RAM 43, and a CPU 45. The ROM 41 stores data and programs that need to hold stored contents even when a power is turned off. The RAM 43 temporarily stores the data. The CPU 45 executes processing according to a program or the like stored in the ROM 41 or the RAM 43.

In the ROM 41 of the vehicle control device 13, a processing program for causing the vehicle control device 13 to execute, for example, a merging control process for supporting the driving of the host vehicle J in a situation where the traveling road (that is, the merging road) on which the vehicle J travels merges into another road (that is, the main road) among processes necessary for realizing the self-driving function is stored.

Figure 2:
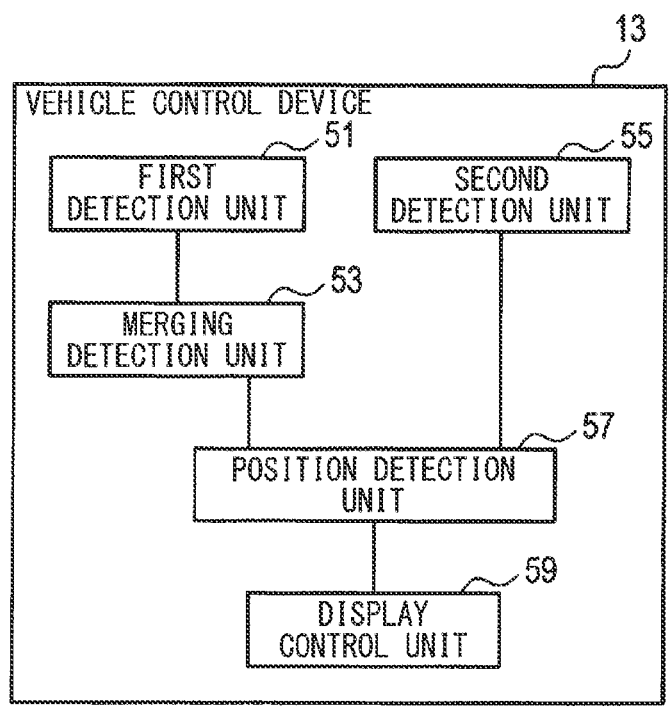
FIG. 2 is a block diagram functionally showing a vehicle control device.

As shown in FIG. 2, the vehicle control device 13 includes, as processing contents to be executed by the processing program, that is, functions of a first detection unit 51, a merging detection unit 53, a second detection unit 55, a position detection unit 57, and a display control unit 59.

The first detection unit 51 detects a traveling state including at least the position and the speed of the host vehicle J.

As will be described later in detail, when the host vehicle J is traveling on the merging road toward the merging point, the merging detection unit 53 detects that the host vehicle J approaches within a predetermined area (for example, a predetermined distance) from the merging point on the road where the merging road and the main road merge together at the merging point.

The second detection unit 55 detects a speed of a lane flow of the other vehicle T traveling toward the merging point on the main road.

As will be described in detail later, the position detection unit 57 sets a pre-merging point which is a virtual point that moves toward the merging point according to the flow of the lane on the main road, and reaches the merging point when the host vehicle J reaches the merging point. In other words, it is assumed that the pre-merging point moves on the main road in this way. The position detection unit 57 obtains the position of the pre-merging point at the present time based on a time until the host vehicle J reaches the merging point and a speed of the lane flow on the main road, when the host vehicle J approaches within the predetermined area from the merging point.

The display control unit 59 causes the display device 29 to display the position of the host vehicle J on the merging road at the present time and the position of the pre-merging point on the main road at the present time.

Various functions of the vehicle control device 13 are realized by causing the CPU 45 to execute the program stored in a non-transitory tangible recording medium. In this example, the ROM 41 corresponds to a non-transitory tangible recording medium storing a program. Also, with the execution of the program, a method corresponding to the program is executed. The number of microcomputers configuring the vehicle control device 13 may be one or more.

[1-2. Display Method of Pre-Merging Point]

Next, a method of displaying the pre-merging point will be described.

Now, as shown in FIGS. 3 and 4, a road on which traffic keeps to the left will be described as an example. For example, a highway which is a road dedicated to a car has two opposing lanes is taken as an example. In other words, let us consider a case where one lane road (that is, merging road GD) merges with one lane of a two-lane highway which is the main road HD, that is, a lane on the left side of FIGS. 3 and 4.

Specifically, in the case of a road having a structure in which the merging road GD merges into the main road HD described above, actually, the host vehicle traveling on the merging road GD reaches one of the lanes of the main road HD, that is, the lane on the merging road GD side lane (hereinafter referred to as the main lane HS).

When there are multiple lanes on one side such as two lanes on one side, a lane on the outermost side, that is, a lane on the side to which the merging road GD is connected may be considered.

Further, in FIG. 4, the host vehicle J on the merging road GD is indicated by a host vehicle mark 61 surrounding a V-shaped portion 61a with a circular frame body 61b. The position of the host vehicle mark 61 is the current position of the host vehicle J, and a tip side of the V-shaped portion indicates a traveling direction. Further, in the two-lane main road HD, the other vehicles T on the main lane HS and on the opposing lane TS are indicated by circular other vehicle marks 63. Further, a pre-merging point JG to be described later is indicated by a pre-merging point mark 65 surrounding a double circle 65a and a periphery of the double circle 65a with a rectangular frame body 65b.

A point where the merging road GD and the main road HD merge together, in particular, a point where the merging road GD and the main lane HS merge together is a merging point GT, and in FIG. 4, a point at which a center line of a width of the merging road GD and a center line of a width of the main lane HS intersect with each other is indicated by a circle as the merging point GT.

First, a concept of the pre-merging point JG will be described.

When the host vehicle J under the self-driving is traveling on the merging road GD toward the merging point GT, the host vehicle J reaches the merging point GT after a predetermined time. At this time, when the other vehicle T is traveling on the main lane HS, the other vehicle T reaches the merging point GT after a certain time according to the flow of the lane in the same manner.

The lane flow normally means an overall flow of the vehicles when the multiple vehicles are traveling on the same lane. In other words, even when the speed is different for each car, the lane flow means a traveling state of the vehicles along the lane when viewed as a whole.

In this case, instead of considering that the host vehicle J and the other vehicles T reach the merging point GT at the same time, it is assumed that "a space without any vehicle" moves at the same speed and reaches the merging point GT at the same time. In other words, the "space without any vehicle" moving toward the merging point GT corresponds to the pre-merging point JG.

Therefore, as with the other vehicles T, the pre-merging point JG moves on the main lane HS according to the flow of the lane, and can be regarded as reaching the merging point GT after a lapse of a predetermined time.

Next, a method for obtaining the position of the pre-merging point JG will be described in more detail.

As shown in FIG. 4, in the case where the host vehicle J is approaching the merging point GT on the merging road GD, when a speed of the host vehicle J is set to V1 and a distance from the current position of the host vehicle J to the merging point GT is set to a first distance S1, a time TM until the host vehicle J reaches the merging point GT is obtained by S1/V1.

On the other hand, in the case where the other vehicles T approach the merging point GT on the main lane HS, when the speed of the flow of the vehicles (in other words, the flow of the lane) on the main lane HS is set to V2, the other vehicles T and the pre-merging point JG move by a distance (that is, a second distance) S2 obtained by the speed V2×time TM along the flow of the lane during the time TM until the host vehicle J reaches the merging point GT.

In the present specification, the speed V2 of the flow of the lane means a speed obtained by averaging the speeds of the multiple other vehicles T traveling on the main lane HS as a whole, and can employ, for example, an average value of the speeds of the multiple other vehicles T in a predetermined range on the main lane HS. When the number of other vehicles T is one, a speed of the other vehicle T can be employed.

Since the time TM is the time until the host vehicle J reaches the merging point GT, when viewed on the main lane HS, the pre-merging point JG is present at a position upstream of the merging point GT by the second distance S2.

In other words, as described above, the pre-merging point JG moves on the main lane HS toward the merging point GT in association with the movement of the other vehicles T, in other words, according to the flow of the lane, and reaches the merging point GT when the host vehicle J reaches the merging point GT. In other words, the pre-merging point JG is not an actual merging point but a virtual merging point at the present time.

In this way, the position of the pre-merging point JG at the present time, that is, the position of the host vehicle J at the present time and the position of the pre-merging point JG at the same time can be obtained by the method described above.

[1-3. Processing]

Next, a merging control process to be executed by the vehicle control device 13 will be described.

As described above, the merging control process means processing at the time of merging in the case where a route guidance by the navigation apparatus 5 is being executed on a road having a structure in which the merging road GD merges into the main lane HS, for example, on a highway which is an exclusive road for a car. In other words, the merging control process is a process of displaying information on the host vehicle J and information on the surroundings of the host vehicle J on the display device 29 when the host vehicle J traveling on the merging road GD during the self-driving reaches the main lane HS.

In more detail, the merging control process is a process of displaying, on the display device 29, the host vehicle J that approaches the merging point GT on the merging road GD, the other vehicles T that approach the merging point GT on the main lane HS, the pre-merging point JG, and so on when the host vehicle J approaches the merging point GT by self-driving.

The merging control process according to the present embodiment is repeatedly activated at predefined time intervals during a period in which the process for realizing the self-driving function is being executed.

Figure 5:
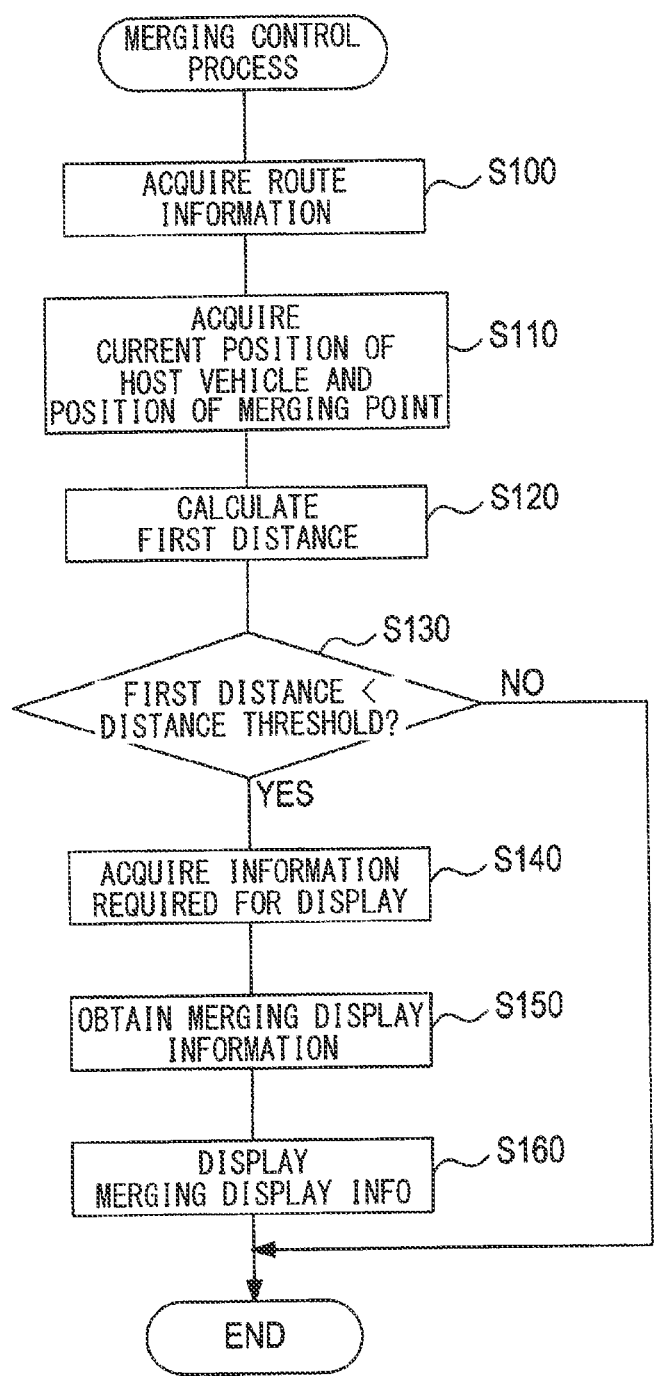
FIG. 5 is a flowchart showing a merging control process to be performed by the vehicle control device.

As shown in FIG. 5, when the merging control process is activated during the self-driving, the vehicle control device 13 firstly acquires a planned travel route K from the navigation apparatus 5 in Step 100. The planned travel route K acquired in Step 110 is a route (that is, route information) on which the host vehicle is scheduled to travel to a destination input through the navigation apparatus 5. In FIG. 5, "Step" is described as "S".

In the subsequent Step 110, the current position of the host vehicle J and the position (latitude, longitude, and altitude) of the merging point GT are acquired from the navigation apparatus 5.

In the present specification, the position of the merging point GT is present on the planned travel route K and closest to the current position of the host vehicle J, that is, latitude, longitude, and altitude. In Step 110, the vehicle control device 13 specifically acquires the position of the merging point GT from the map data stored in the navigation storage device 37. For ease of computation, altitude information can be omitted. The omission of the altitude information is the same below.

In the subsequent Step 120, a distance (that is, a first distance) S1 along the travel route from the current position of the host vehicle J acquired in Step 110 to the position of the merging point GT is derived (that is, calculated). In this Step 120, the vehicle control device 13 derives the first distance S1 along the planned travel route K, that is, along a road shape of the planned travel route K.

In the subsequent Step 130, it is determined whether the host vehicle J approaches the merging point GT, or not. That is, it is determined whether the first distance S1 derived in Step 120 is less than a predefined distance threshold (for example, 200 m), or not.

In the present specification, the distance threshold is a determination value at which assistance for driving of the host vehicle J should be started in a situation where the merging road GD on which the host vehicle J travels merges with the main lane HS, and defined as an upper limit value of the distance from the position of the merging point GT. The distance threshold value may be obtained in advance through experiments or the like.

As a result of the determination in Step 130, if the first distance 51 is less than the distance threshold value, the process proceeds to Step 140. Otherwise, since the host vehicle J does not yet approach the merging point GT, the present process is once terminated.

In Step 140, because the host vehicle J is approaching the merging point GT, various kinds of information necessary for displaying the display information (that is, merging display information) relating to the merging described later is acquired.

Specifically, the speed V1 and so on of the host vehicle J is acquired from the vehicle speed sensor 21 or the like of the host vehicle sensors 7 of the host vehicle J. At this time point, the navigation apparatus 5 normally displays the planned travel route K and the position of the host vehicle J along the travel planned route K on the display device 29.

Further, a vehicle-to-vehicle communication with the other vehicle T in the vicinity of the host vehicle J, or a road-to-vehicle communication between the host vehicle J and the roadside device 18 is performed to acquire information on the speed, the traveling direction, the position, and so on of the other vehicle T traveling on the main lane HS.

With the above information, information on the other vehicles T traveling toward the merging point GT on the main lane HS can be acquired. Information on the other vehicles T traveling on the opposing lane TS of the main lane HS is also acquired.

Further, the peripheral information such as the position of lane lines, signs, and so on is acquired from the information from the periphery recognition device 9 (for example, the camera 15). Further, various kinds of peripheral information such as a connection state (for example, the shape of roads) between the merging road HS and the main lane HS are acquired from the navigation apparatus 5.

In subsequent Step 150, merging display information to be displayed on the display device 29 is obtained based on the information acquired in Step 140.

For example, as described with reference to FIG. 4, the time TM to the merging point GT is obtained based on the speed V1 of the host vehicle J and the first distance S1 through calculation of S1/V1. Further, the speed V2 of the lane flow on the main lane HS is obtained based on the speed of the multiple other vehicles T in a predetermined range, for example, an average value of the speeds of the multiple other vehicles. The second distance S2 along the traveling route on the main lane HS is obtained based on the time TM and the speed V2 by calculation of TM×V2, to obtain the position of the pre-merging point JG.

As the other vehicles T within the predetermined range, for example, the other vehicles T present in an area from the merging point GT to a predetermined distance on an upstream side, for example, in an area of the first distance S1, a multiple of the first distance S1 can be adopted.

In this example, the merging display information is displayed on the display device 29 from before the merging point GT. For example, the merging display information is displayed if an affirmative determination is made in Step 130. The merging display information will be described in detail later.

In the subsequent Step 160, the merging display information obtained in Step 150 is displayed on the display device 29 as described later, and the present process is terminated once.

[1-4. Merging Display Information]

Now, merging display information to be displayed on the display device 29 at the time of merging described above will be described.

Figure 6:
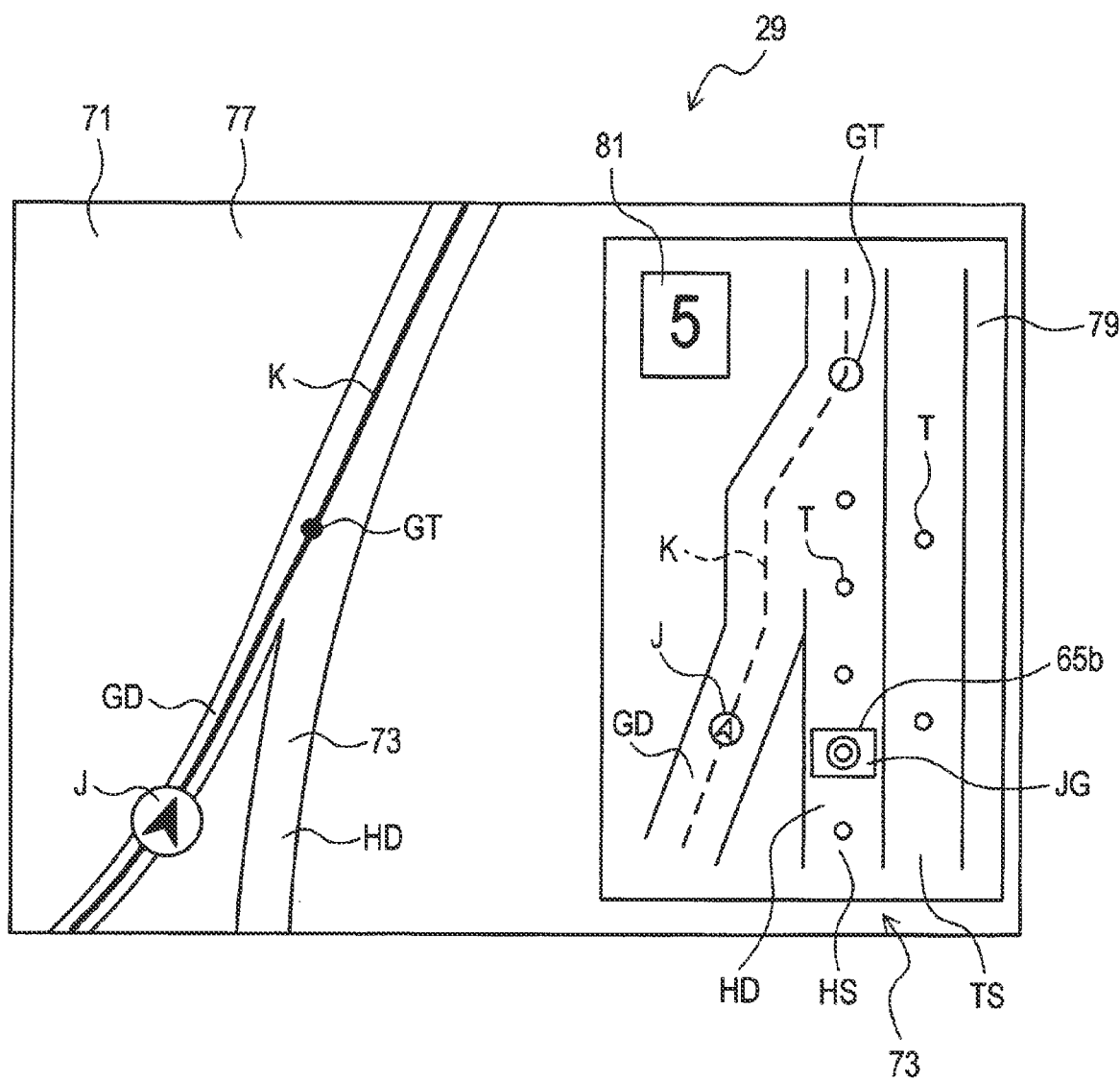
FIG. 6 is an illustrative view showing a merging display image and the like displayed on a display device.

As shown in FIG. 6, as is well known, various kinds of map information on a road 73 and so on is displayed on the display device 29, for example, on a display surface 71 of a horizontally elongated rectangle of the display device 29 before the host vehicle J approaches the merging point GT. When the route guidance is set by the self-driving or the like, the planned travel route K is displayed in a line shape with a noticeable color or the like on the road 73.

Further, the host vehicle mark 61 indicating the position and the traveling direction of the host vehicle J is displayed on the planned travel route K so as to display the position of the host vehicle J.

When the host vehicle J approaches the merging point GT, a partial screen 79 on which the merging display information is displayed is displayed so as to overlap with a screen (hereinafter referred to as a base screen) 77 on which the entire map information on the display surface 71 is displayed.

For example, a partial screen 79 is displayed on the right side of the base screen 77 so that the merging point GT of the base screen 77 is visible. In the partial screen 79, an image to be displayed on the partial screen 79 is displayed as a transmission image (for example, a semi-transmission image) so that the image of the base screen 77 is transmissively visible. The image to be displayed on the partial screen 79 may be a non-transmission image so that the base screen 77 on the partial screen 79 is not displayed at all.

An image indicating the merging display information (that is, merging display image) is displayed on the partial screen 79. In the merging display image, the roads in the vicinity of the merging point GT are schematically enlarged and displayed.

In this case, as described above, an example in which the merging road GD on which the host vehicle J travels is set as a single lane road and the road with which the merging road GD merges (that is, the main road HD) is divided into two lines having the main lane HS and the opposing lane TS will be described.

Specifically, in the merging display image, the host vehicle mark 61 indicating the position and traveling direction of the host vehicle J at the present time is displayed on the merging road GD. In addition, on the main lane HS and the opposing lane TS, the positions of the other vehicles T traveling on the main lane HS and the opposing lane TS at the present time are indicated by the other vehicle mark 63 such as a circle. The host vehicle mark 61 and the other vehicle mark 63 move along the passage of time.

Particularly, in the present embodiment, the pre-merging point mark 65 indicating the pre-merging point JG is displayed at a position deviated to the upstream side from the merging point GT along the main lane HS, such as between the other vehicle marks 63 on the main lane HS. The upstream side is lower in FIG. 5.

In displaying each piece of information, a distance from the host vehicle mark 61 to the merging point GT, distances from the merging point GT to each of the other vehicle marks 63 and the pre-merging point mark 65 in the same lane, distances between the other vehicle marks 63, and a distance between each of the other vehicle marks 63 and the pre-merging point mark 65 are set to lengths corresponding to the actual distances, for example, a length proportional to the actual distance. Alternatively, those distances are set to lengths indicating a relationship of the actual distances as much as possible.

Further, in order to intuitively grasp that there is a mergeable space when the host vehicle J joins, the pre-merging point mark 65, specifically, the frame body 65*b* indicating an area of the pre-merging point mark 65 is indicated within a size showing a predetermined area along the direction in which the main lane HS extends and within a width of the lane.

In other words, when the host vehicle J joins at the merging point GT, since the host vehicle J moves at a high speed and normally the speed also changes somewhat, a certain space is required in a front-rear direction on the road. Therefore, the pre-merging point JG is indicated by not a small point on the partial screen 79 but the pre-merging point mark 65 having a predetermined area so as to correspond to the space.

The size of the pre-merging point mark 65 corresponding to the space in which the host vehicle J can safely join when the host vehicle J joins at the merging point GT can be obtained by experiment or the like. The space which is a length along the lane, that is, the pre-merging point mark 65 is considered to become larger, that is, longer as the speed V1 of the host vehicle J and the speed V2 of the lane flow are higher.

The space required for the actual merging may be, for example, about several times the dimension in the front-back direction of the actual host vehicle J. Therefore, considering the widths of the road and the lane, the partial screen 79 is shown in approximate scale.

In the present embodiment, the pre-merging point mark 65 is displayed so as not to overlap with the other vehicle mark 63.

For example, when there is not enough space when the host vehicle J merges at the merging point GT, if the pre-merging point mark 65 of an initial setting size is displayed as it is, the pre-merging point mark 65 may overlap with the other vehicle mark 63 in some cases.

Figure 7:
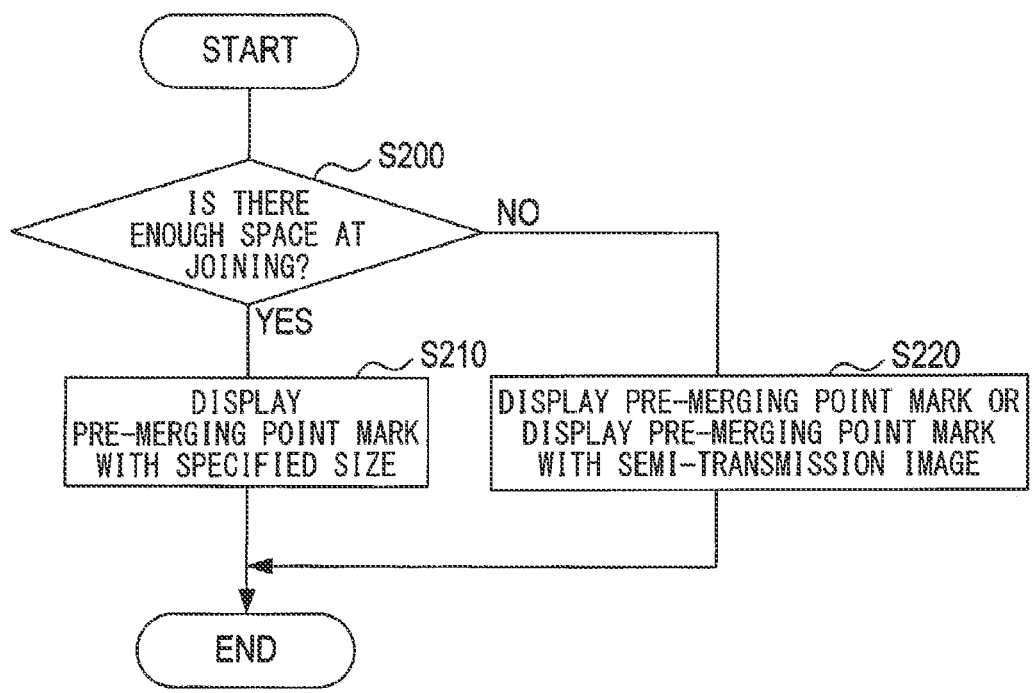
FIG. 7 is a flowchart showing a process of displaying a pre-merging point mark in a merging control process.

Accordingly, in order to deal with such a case, as shown in FIG. 7, when the pre-merging point mark 65 and so on are displayed, the determination of the display can be performed. The determination processing is a part of the processing in Step 160.

More specifically, in Step 200 in FIG. 7, when the host vehicle J joins on the main lane HS in the current situation based on the position and the speed V1 of the other vehicle J, that is, based on the flow of the lane, it is determined whether there is sufficient space between the other vehicles, or not. If an affirmative determination is made, the flow proceeds to Step 210, and if a negative determination is made, the flow proceeds to Step 220.

In other words, since the length between the other vehicle marks 63 and the length of the pre-merging point mark 65 corresponds to the actual distance, it is determined whether the pre-merging mark 65 overlaps with the other vehicle marks 63, or not, if the pre-merging point mark 65 is displayed on the partial screen 79 as it is.

In Step 210, since there is enough space to merge, that is, since the pre-merging point mark 65 and the other vehicle marks 63 do not overlap with each other, the other vehicle marks 63 and the pre-merging point mark 65 are displayed as they are, and the present processing is terminated once.

On the other hand, since there is not enough space to merge in Step 220, the other vehicle marks 63 are displayed, but the pre-merging point mark 65 is not displayed, and the present processing is terminated once.

Apart from the above case, the pre-merging point mark 65 may be superimposed on the other vehicle mark 63, for example, on a semi-transmission image. In this case, in order to notify that there is not enough space for the merging in the current situation, for example, the pre-merging point mark 65 may be emphasized and displayed with blinking.

In addition, a time display column 81 is provided at an end (for example, upper left) of the partial screen 79 to display a time taken for the host vehicle J to reach the merging point GT. In the time display column 8, for example, the number of seconds or the like required for arrival is displayed in countdown. Therefore, the numeral in the time display column 81 decreases toward the merging point GT.

The contents to be displayed on the partial screen 79, for example, the host vehicle mark 61, the other vehicle marks 63, the pre-merging point mark 65, the merging point GT, the planned travel route K, and the like may be displayed as emphasized images to be emphasized as compared with surrounding images and displayed, or may be displayed as a transmission image (for example, a semi-transmission image) in which a lower image is transmissively visible. In the case of emphasizing the image, various well-known methods can be employed such as making the type of color more conspicuous than the surrounding color, darkening the color depth, blinking the image, and the like.

Further, as the contents to be displayed on the partial screen 79, various kinds of peripheral information in the vicinity of the merging point GT may be displayed by marks or the like corresponding to the contents of the character or the peripheral information, in addition to the above-mentioned various marks and the like.

As the peripheral information, for example, information on road regulation due to construction, accident or the like, information on traffic congestion, and so on can be employed.

[1-5. Advantages]

According to the present embodiment described in detail above, the following advantages can be obtained.

(1a) According to the present embodiment, when the host vehicle J approaches the merging point GT by self-driving, the current position of the host vehicle J and the position of the current pre-merging point JG can be displayed on the display device 29. The pre-merging point JG moves toward the merging point GT as if the other vehicle T traveling on the main road HD, more specifically on the main lane HS. As described above, the display device 29 can simultaneously display the host vehicle J approaching the merging point GT on the merging road GD, as well as the pre-merging point JG and the other vehicles T approaching the merging point GT on the main lane HS with the passage of time.

Therefore, the occupant can predict how the host vehicle J during self-driving will join while viewing such a display. In other words, the occupant can find that the host vehicle J can safely join at the merging point GT as a target. Therefore, even when joining in the self-driving, the occupant's feeling of uneasiness can be reduced, and the sense of security in the self-driving is greatly improved.

(1b) According to the present embodiment, the time TM until the host vehicle J reaches the merging point GT can be obtained based on the speed V1 of the host vehicle J and the first distance S1 from the position of the host vehicle J to the merging point GT. Further, the time TM is multiplied by the speed V2 of the lane flow on the main lane HS, thereby being capable of obtaining the second distance S2 from the merging point GT to the pre-merging point JG. Further, the position of the pre-merging point JG on the main lane HS at the present time point can be obtained according to the second distance S2 along the main lane HS.

(1c) According to the present embodiment, the speed VS of the lane flow can be obtained based on the speed V2 of the other vehicle T traveling on the main road HD, more specifically, the main lane HS.

(1d) According to the present embodiment, when the host vehicle J falls within a predetermined distance from the merging point GT at the first distance S1 along the merging road GD, it can be determined that the host vehicle J approaches the merging point GT.

(1e) According to the present embodiment, the pre-merging point JG is displayed on the main lane HS so as to have an area of a predetermined range along the direction in which the main lane HS extends. Therefore, since the occupant intuitively understands that there is a sufficient merging area, the occupant's sense of security is improved.

(1f) According to the present embodiment, the pre-merging point JG and the other vehicles T are displayed so as not to overlap with each other. As a result, a positional relationship between the pre-merging point JG and the other vehicles T can be clearly grasped.

(1g) According to the present embodiment, the display device 29 displays at least the travel route until the host vehicle J reaches the merging point GT with an emphasized image or a transmission image that is emphasized as compared with the surrounding images. Therefore, in the case of displaying with the emphasized image, it is possible to easily recognize the travel route. Further, in the case of displaying in a transmission image (for example, a semi-transmission image), it is possible to recognize a wide range of information from the base screen 77.

(1h) According to the present embodiment, since the merging point GT is displayed on the display device 29, the travel route up to the merging point GT can be easily recognized.

(1i) According to the present embodiment, the merging point GT can be displayed on the display device 29 with an emphasized image or a transmission image in the same manner as described above.

(1j) According to the present embodiment, since the peripheral information indicating the circumstances around the merging point GT is displayed on the display device 29, the circumstances around the merging point GT can be accurately grasped to improve the sense of security.

(1k) According to the present embodiment, since the display device 29 displays the time (that is, the predicted time) required for the host vehicle J to reach the merging point GT in a countdown, there is an advantage that the time until reaching the merging point GT is well found.

In the embodiment described above, the first detection unit 51, the merging detection unit 53, the second detection unit 55, the position detection unit 57, and the display control unit 59 correspond to an example of a first detection unit, a merging detection unit, a second detection unit, a position detection unit, and a display control unit.

2. Other Embodiments

Hereinbefore, embodiments of the present disclosure have been described. However, the present disclosure is not limited to the above-described embodiments, and various aspects can be made in a range not departing from the technical range of the present disclosure.

(2a) For example, in the embodiment described above, the case where the host vehicle is in the self-driving has been exemplified. However, the present disclosure can also be applied to a case where the host vehicle is not in the self-driving.

Specifically, in the case where the host vehicle travels by the driver's operation, when it is detected that the vehicle approaches the merging point, similarly to the embodiment described above, the pre-merging point and the positions of the other vehicles may be displayed on the display device in addition to the position of the host vehicle.

(2b) Further, the present disclosure can be applied not only during self-driving but also when the route guidance to the destination by the navigation apparatus is not being implemented.

Specifically, when the host vehicle is traveling by the driver's operation, when it is detected that the host vehicle approaches the merging point based on the map information or the like of the navigation apparatus, the pre-merging point and the positions of the other vehicles may be displayed on the display device in addition to the position of the host vehicle, in the same manner as that in the embodiment described above.

(2c) Furthermore, in the above embodiment, the one-lane merging road and the two-lane main road are taken as examples, but the present disclosure is not limited to the above examples. For example, roads of plural lanes can be applied as a merging lane. Also, as a single-lane road or a road that exceeds two lanes can be applied as the main road.

(2d) The present disclosure can be applied to a road of the right hand traffic.

(2e) Furthermore, in the present disclosure, for example, a merging display image to be displayed on a partial image is not limited to the image shown in FIG. 6, and various images can be applied.

(2f) In the embodiment described above, even if the position of the pre-merging point is required as described above, when the positions of the other vehicles are close to each other, the pre-merging point mark can be prevented from being displayed. Alternatively, in order to indicate the position of the pre-merging point, the pre-merging point mark may be reduced to the same size as the other vehicle marks and displayed.

In such a case, since there is no mergeable space at this time, the host vehicle adjusts the speed and the like by self-driving and joins when the mergeable space is found.

(2g) Further, when there is no other vehicle, the pre-merging mark may not be displayed. Alternatively, the pre-merging point mark may be displayed, but in that case, since the speed of the other vehicle is not known, the speed of the host vehicle may be employed instead of the speed of the other vehicle.

(2h) Further, the approaching of the host vehicle to the merging point may be detected by a fact that the host vehicle approaches within the predetermined distance of the merging point based on the map information. However, for example, the approaching may be detected by a communication device such as a beacon which is installed on a road side. In other words, for example, a signal indicating that the host vehicle approaches the merging point is output from a roadside device, and the fact that the host vehicle approaches the merging point may be detected based on the signal.

(2i) In addition, a function of one constituent element in the above-described embodiments may be distributed to a plurality of constituent elements, or functions of a plurality of constituent elements may be integrated into one constituent element. A part of the configuration according to the above-described embodiment may be omitted. Also, at least a part of the configuration in the above embodiments may be added to or replaced with another configuration in the above embodiments.

(2j) Furthermore, in addition to the vehicle control device described above, the present disclosure can be realized by various configurations such as a system including the vehicle control device as a component, a program for causing the computer to function as the vehicle control device, a non-transitory tangible recording medium such as a semiconductor memory in which the program is recorded, or a method of controlling a vehicle.

In addition, some or all of the functions executed by the vehicle control device may be configured in hardware by one or more ICs or the like.

(2k) As a display device, a head-up display device for superimposing and displaying the display content of the present disclosure on the outside in front of the vehicle can be applied.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicle control device comprising:
a first detection unit that detects a traveling state including at least a position and a speed of a host vehicle;
a merging detection unit that detects that the host vehicle approaches within a predetermined area of a merging point on a road in which a merging road and a main road join together at the merging point when the host vehicle travels on the merging road toward the merging point;
a second detection unit that detects a speed of a lane flow by an other vehicle that travels on the main road toward the merging point;
a position detection unit that sets a pre-merging point as a virtual point moving on the main road toward the merging point according to the lane flow, the pre-merging point reaching the merging point when the host vehicle reaches the merging point, and obtains a position of the pre-merging point on the main road at a present time based on a time required for the host vehicle to reach the merging point and the speed of the lane flow on the main road when the host vehicle approaches within the predetermined area of the merging point; and
a display control unit that controls a display device to display the position of the host vehicle on the merging road at the present time and the position of the pre-merging point on the main road at the present time, wherein:
the display control unit determines based on the speed and position of the other vehicle on the main road whether there is sufficient space on the main road for the host vehicle to join the main road;
when there is sufficient space, the display control unit displays the pre-merging point not to overlap the other vehicle;
when there is not sufficient space, the display control unit does not display the pre-merging point; and
the display control unit determines whether there is sufficient space on the main road for the host vehicle to join the main road by determining whether a display of the pre-merging point overlaps a display of the other vehicle.

2. The vehicle control device according to claim 1, wherein:
a length of the display of the pre-merging point corresponds to an actual distance of the pre-merging point; and
a length of the display between the other vehicle and a further other vehicle corresponds to an actual distance between the other vehicle and the further other vehicle.

* * * * *